Feb. 28, 1956  G. H. HILL  2,736,204
INDEXING APPARATUS
Filed Nov. 2, 1953
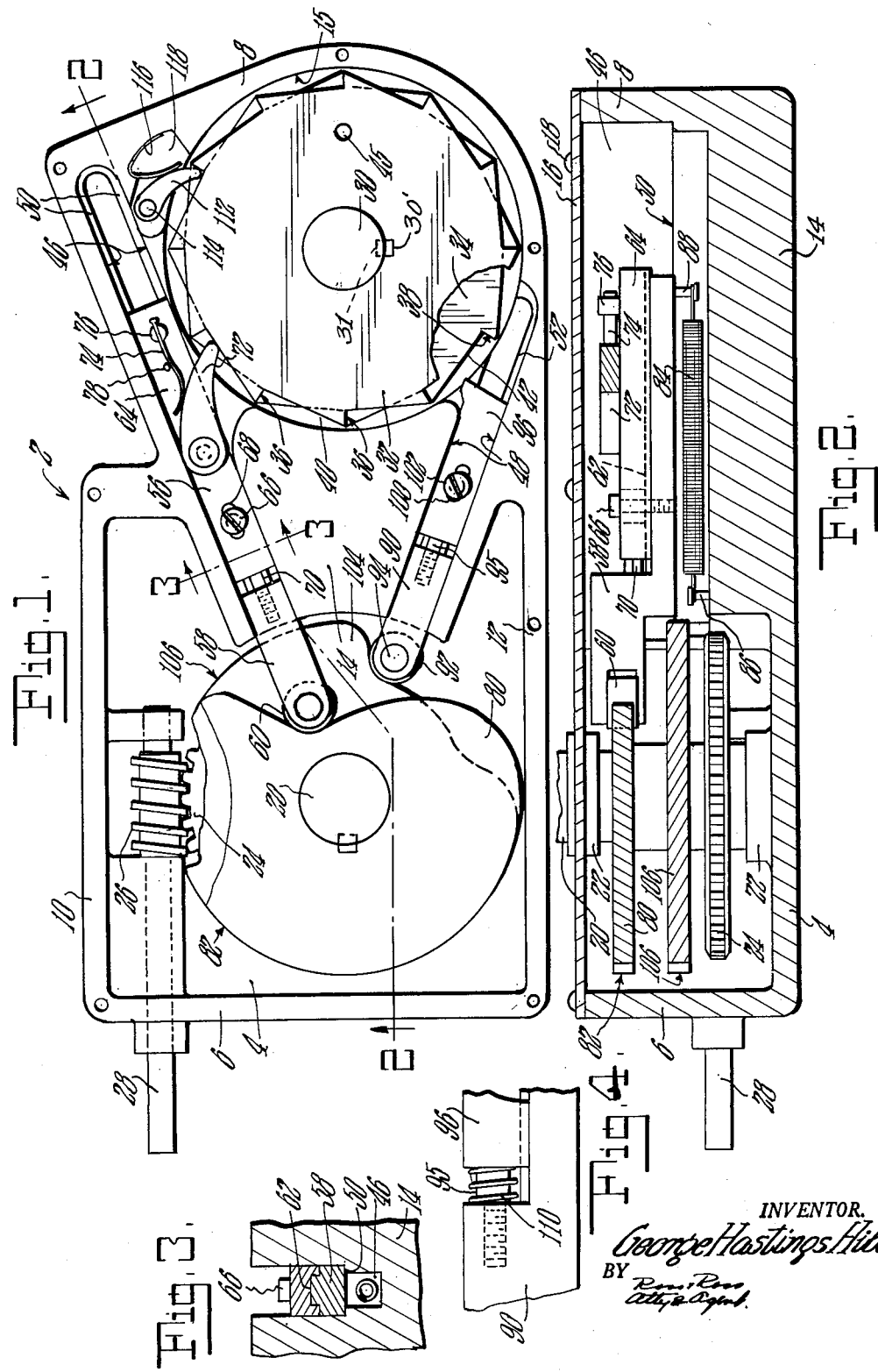
INVENTOR.
George Hastings Hill.
BY

United States Patent Office 2,736,204
Patented Feb. 28, 1956

2,736,204

INDEXING APPARATUS

George Hastings Hill, Williamsburg, Mass.

Application November 2, 1953, Serial No. 389,716

6 Claims. (Cl. 74—125)

This invention relates to improvements in indexing apparatus and this application is a continuation in part of application Serial Number 327,106, filed by me on December 20, 1952.

The principal objects of the invention are directed to the provision of indexing apparatus constructed and arranged for rapid and accurate indexing purposes; that is to say, the apparatus is adapted to rotate a table or the like in a step-by-step manner through predetermined angles and is characterized by means for indexing and stopping and locking a table or the like.

The apparatus is adapted for indexing purposes generally but as an example, it is adapted to successively locate objects relative to a tool or tools or the like for performing an operation or operations.

According to novel features of the invention, an indexing shaft is rotated or indexed through a predetermined angle by positively operating means to and against stop means thereby to obtain extreme accuracy of indexing for many and various purposes.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of indexing apparatus embodying the novel features of the invention;

Fig. 2 is a longitudinal sectional elevational view on the line 2—2 of Fig. 1;

Fig. 3 is a transverse sectional elevational view on the line 3—3 of Fig. 1; and Fig. 4 is a side elevational view of a portion of the stop pawl of the apparatus shown in Fig. 1.

Referring now to the drawings more in detail, the invention will be fully described.

A support is provided which for purposes of description is shown as a housing 2. Said housing has a bottom wall 4, end walls 6 and 8, side walls 10 and 12 with an elevated portion 14 at one end thereof.

A cover 16, as shown in Fig. 2, is disposed on the side and end walls and may be secured thereto by screws such as 18 threadedly engaging said walls.

An operating shaft 20 is rotatable in bearings 22 of the housing and may be rotated by various means. For illustrative purposes, a worm gear 24 is fixed to shaft 20 and a worm gear 26 fixed to a shaft 28 rotatable in the housing is in mesh with said gear 24. The shaft 28 may be rotated by any means desired so as to rotate the operating shaft 20.

The elevated portion 14 is provided with a well 15 and an indexing shaft 30 rotatable in the housing has fixed thereto an upper indexing ratchet 32 and a lower stop ratchet 34. The said ratchets are provided with circumferentially spaced teeth 36 and 38 respectively. The ratchets are relatively arranged so that the parts 40 and 42 of the ratchet teeth extend in opposite directions as shown in Fig. 1. The said ratchets may be termed right and left hand and in the indexing operation the ratchets are rotated clockwise.

For purposes of accuracy in operation the ratchets are held together on a shaft such as 30 with a key 3' in a keyway 30' thereof, and the ratchet teeth are formed to locate the faces 36 and 38 of the ratchets in alignment. Before forming the teeth one of the ratchets is provided with a hole therethrough.

After forming of the teeth the ratchets are reversed relative to one another on the shaft and held against relative movement by the key and with the faces of the teeth in alignment. With the hole in one ratchet as a guide such as hole 45 in ratchet 32 a hole is formed in the other ratchet.

With the ratchets in reversed relation on the shaft and the shaft in its bearing of the housing a hole is drilled in the bottom of the housing using hole 45 of the ratchets as a guide. The holes in the ratchets and in the housing are in alignment, are indicated at 45 in Fig. 1 and are to receive a pin to hold the ratchets against movement for adjustment of the pawl means.

The housing is provided with elongated grooves 46 and 48 which relatively diverge outwardly from the axis of shaft 20. These grooves are for actuating and stop pawl means to be described and have the shelves 50 and 52 along opposite sides thereof.

Actuating pawl means indicated generally by 56 includes a slide 58 reciprocable back and forth on shelves 50 of groove 46. A roll 60 is journalled in the end of slide 58 and said slide is provided with an elongated rib 62 on the upper side thereof. A pawl carrier 64 is adjustable along the slide 58 and is clamped thereto by a bolt or screw 66 extending through a slot 68 of the carrier which is threaded in the slide. An adjusting bolt 70 threaded in the slide is engageable with the rear end of the carrier.

A pawl 72 for engaging and acting on the teeth of the upper indexing ratchet is pivoted as shown to the carrier 64. A leaf spring 74 has an end fixed in a stud 76 secured to the housing and is pressed against the pawl by a stud 78.

An actuating cam 80 is fixed to shaft 20 and is formed to reciprocate the actuating pawl means back and forth in the groove therefor. Said cam is provided with a dwell portion 82.

A spring 84, see Fig. 2, below the slide 58 has opposite ends connected to studs 86 and 88 fixed to the slide and housing to urge the pawl means towards the cam 80.

Stop pawl means includes a slide 90 reciprocable on shelves 52 of groove 48 and has a roll 92 journalled at 94 therein.

A holding or stop pawl 96 having a forward end, as shown, for engaging the teeth of the lower stop ratchet is adjustably movable on the slide similarly to the pawl carrier 64 and slide 58 by means of a slot 100 receiving a screw 102 of the slide.

An adjusting screw 95 similar to adjusting screw 70 is threaded in the slide 90 to engage pawl 96.

A pawl 104 for operating the stop cam means is fixed to the shaft 20 and has a peripheral dwell portion 106.

Means such as the spring shown in connection with slide 58 is provided for slide 90 of the stop pawl means to urge the same towards cam 104.

In adjusting the apparatus, a pin is inserted in the holes 45 of the upper and lower ratchets and hole of the housing to lock the ratchets against rotation. With the roll 60 on the dwell of cam 80 which is the limit of the outward movement of slide 58, the carrier 64 is adjusted so that the end of pawl 72 is up against a tooth 36 of ratchet 32 and screw 70 of the slide 58 is adjusted to back up the carrier.

With the roll 92 of slide 90 on the dwell of cam 104 the forward end of pawl 96 is adjusted so as to abut a tooth 38 of the lower ratchet 34. Then adjusting screw 95 is adjusted up against pawl 96.

Thus with both pawl means in their extended positions and with their pawls against teeth of their respective ratchets and with the desired adjustment the ratchets are rotatable by their respective pawl means as actuated by the cams. With accurate spacing and accurate formation of the ratchet teeth extremely accurate indexing of shaft 30 is accomplished.

For operation of the apparatus the pin in the holes 45 is removed and shaft 20 is rotated so that the actuating pawl means is moved outwardly for engaging a tooth of the upper ratchet to rotate it through an angle depending upon the number of teeth in the ratchet.

Likewise the stop pawl means is moved outwardly so that its outer end is disposed for a tooth of the lower ratchet to bring up against.

The cams are formed relative to one another so that the stop pawl is already in its outermost stop position when the actuating pawl has moved to the limit of its movement. Thus the rotation of the ratchets is arrested just as the actuating pawl means completes its actuating outward stroke. In this way the ratchets are firmly locked against movement and with the rolls of the pawl means on the dwell of their respective cams a dwell period is provided between indexing cycles for such operations on the parts indexed as may be desired.

The shaft 30 may be connected to any mechanism it is desired to index and obviously the ratchets and pawls may be arranged to actuate said shaft through such successive angles as may be desired.

It may be desired to provide cushioning means between slide 90 and pawl 96 and said means may include a compression spring 110 around adjusting screw 95, see Fig. 4. With said cushioning means the stop pawl when engaged by a sprocket tooth yields before the screw 95 is engaged by pawl 96. A pawl 112 pivoted at 114 to the housing is engageable with the teeth of ratchet 32 to prevent counterclockwise rotation of said ratchet. A spring 116 in a socket 118 of the housing urges the pawl inwardly.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Indexing apparatus comprising in combination, a support, an index shaft journalled relative to said support for step-by-step indexing rotation, an index ratchet and a stop ratchet having relatively opposed teeth, elongated actuating pawl means reciprocable in said support for a forward movement to engage a tooth of said index ratchet for rotating it through a certain angle and a rearward retracting movement to release said tooth, elongated stop pawl means reciprocable in said support for a forward movement to a stop position for engagement by a tooth of said stop ratchet and a rearward retracting movement away from said stop position, operating means to move said actuating and stop pawl means forwardly arranged and adapted to position said stop pawl means in stop position prior to the limit of forward movement of the actuating pawl means, and means to move said actuating and stop pawl means rearwardly, said actuating and stop pawl means each being adjustable longitudinally, said ratchets and said support provided with registrable openings for receiving a locking pin, said openings of said ratchets being relatively arranged so that with a locking pin in said openings and in the opening of the support said ratchets are locked against rotation with a certain tooth of one ratchet disposed at a predetermined angle relative to a certain tooth of the other ratchet whereby said actuating and stop pawl means may be adjusted so as to engage said certain teeth of the ratchets.

2. Indexing apparatus set forth in claim 1 wherein said operating means includes an operating shaft journaled in said housing and spaced from said index shaft having cams fixed thereto engaging and acting on said actuating and stop pawl means.

3. Indexing apparatus set forth in claim 1 wherein said index and stop ratchets are in adjacency with teeth portions thereof in parallelism and said actuating pawl means and stop pawl means are relatively reciprocal in non-parallel relation.

4. Indexing apparatus set forth in claim 1 wherein said operating means includes an operating shaft journalled in said housing and spaced from said index shaft and is provided with actuating and stop cams engageable with and acting on said actuating and stop pawl means which reciprocate in diverging relation from said operating shaft and have portions engaging circumferentially spaced teeth of said ratchets.

5. Index apparatus set forth in claim 1 wherein said operating means includes an operating shaft spaced from and is journalled in said housing in parallelism with said index shaft and has cams fixed thereto engaging said actuating and stop pawl means for reciprocating the same.

6. Indexing apparatus comprising in combination, a support, an index shaft journalled relative to said support for step-by-step indexing rotation, an index ratchet and a stop ratchet fixed on said shaft having relatively opposed teeth, elongated actuating pawl means reciprocable in said support for a forward movement to engage a tooth of said index ratchet for rotating it through a certain angle and a rearward retracting movement to release said tooth, elongated stop pawl means reciprocable in said support for a forward movement to a stop position for engagement by a tooth of said stop ratchet and a rearward retracting movement away from said stop position, operating means to move said actuating and stop pawl means forwardly arranged and adapted to position said stop pawl means in stop position prior to the limit of forward movement of the actuating pawl means, and means to move said actuating and stop pawl means rearwardly, said actuating and stop pawl means each being adjustable longitudinally, said ratchets and said support provided with registrable openings for receiving a locking pin, said openings of said ratchets being relatively arranged so that with a locking pin in said openings and in the opening of the support said ratchets are locked against rotation with a certain tooth of one ratchet disposed at a predetermined angle relative to a certain tooth of the other ratchet whereby said actuating and stop pawl means may be adjusted so as to engage said certain teeth of the ratchets, and a spring pressed pawl means mounted on said housing engageable with the teeth of said indexing ratchet to hold it against rotation in one direction.

References Cited in the file of this patent

UNITED STATES PATENTS

| | | |
|---|---|---|
| 646,287 | Hundhausen | Mar. 27, 1900 |
| 1,267,497 | Barton | May 28, 1918 |
| 1,628,074 | Stanley | May 10, 1927 |
| 2,187,544 | Laessker | Jan. 16, 1940 |
| 2,618,982 | Mead | Nov. 25, 1952 |